United States Patent [19]

Hutta

[11] Patent Number: 4,872,894

[45] Date of Patent: Oct. 10, 1989

[54] METHOD FOR RAPID PREPARATION OF HALIDE GLASSES

[75] Inventor: Joseph J. Hutta, Groton, Mass.

[73] Assignee: The United States of America as represented by the Secretary of the Air Force, Washington, D.C.

[21] Appl. No.: 202,659

[22] Filed: May 26, 1988

[51] Int. Cl.$^4$ .......................................... C03B 37/018
[52] U.S. Cl. .......................................... 65/3.11; 65/2; 65/134; 65/DIG. 16; 501/37; 501/40; 501/904
[58] Field of Search .......... 65/3, 11, 2, 134, DIG. 16; 501/37, 40, 904

[56] References Cited

U.S. PATENT DOCUMENTS

| | | | |
|---|---|---|---|
| 4,141,741 | 2/1979 | Lucas et al. | 106/47 Q |
| 4,346,176 | 8/1982 | Kanamori et al. | 501/37 |
| 4,445,755 | 5/1984 | Ohsawa et al. | 350/96.34 |
| 4,539,032 | 9/1985 | Tran et al. | 65/134 X |
| 4,597,786 | 7/1986 | Nakai et al. | 65/2 |
| 4,627,865 | 12/1986 | Roba | 65/DIG. 16 X |
| 4,659,352 | 4/1987 | Robinson | 65/2 |
| 4,666,486 | 5/1987 | Hutta | 65/3.11 |

*Primary Examiner*—Robert L. Lindsay
*Attorney, Agent, or Firm*—Stanton E. Collier; Donald J. Singer

[57] ABSTRACT

An improved method of rapidly forming halide glass wherein the heating and cooling schedule has two phases of heating and cooling. This improved method substantially limits the loss of volatile components because of the significantly shortened interval of time at the elevated melting temperatures. The average time under heating is about 80 minutes. Cooling is as rapid as possible. The homogenization occurs above 800° C. for about 20 minutes.

9 Claims, 2 Drawing Sheets

TWO-STAGE PROCESS FOR HALIDE GLASS PREPARATION

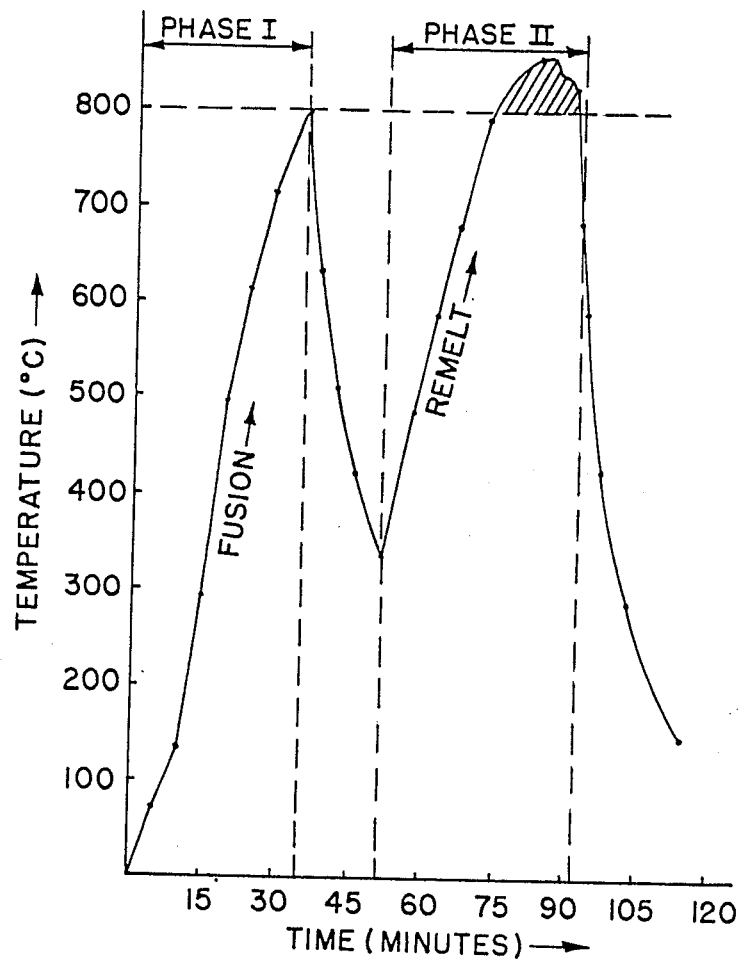
FIG. 1 TWO-STAGE PROCESS FOR HALIDE GLASS PREPARATION
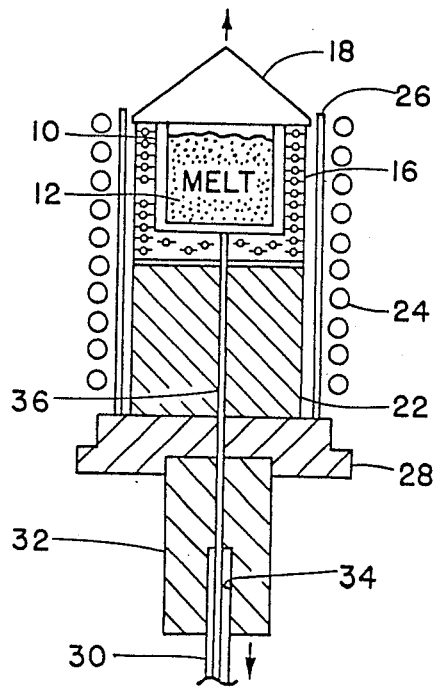
FIG. 2

METHOD FOR RAPID PREPARATION OF HALIDE GLASSES

STATEMENT OF GOVERNMENT INTEREST

The invention described herein may be manufactured and used by or for the Government for governmental purposes without the payment of any royalty thereon.

BACKGROUND OF THE INVENTION

This invention relates to the preparation of glasses, and, in particular, relates to the rapid preparation of glasses with high optical qualities.

Considerable effort has been expended to develop heavy metal halide glasses as a viable family of infrared-transparent optical materials for application as fiber waveguides and as bulk optical components. The specific characteristics of these materials and their advantages in terms of optical performance over silica and other oxide-based glasses are well known.

The heavy metal halide glasses include the so-called fluorozirconate and fluorohafnate glasses as well as glasses in which such atomic species as lead, cadmium, thorium, zinc, uranium, ytterbium, lutertium, gadolinium, cesium, rubidium, sodium, potassium, stroutium, calcium, magnesium, lithium yttrium, gallium, bismuth or beryllium, are either partially or completely substituted for the major constituents zirconium, hafnium, barium and the minor constituents lanthanum and aluminum in the fluorozirconate and fluorohafnate glassmaking formulations.

Because of fundamental physio-chemical differences, these halide glasses are not as easily formed into bulk components (e.g. plates, discs, rods) as are many multicomponent glasses. For example, the viscosity (0.1–1.0 poise) of most heavy metal fluoride melts near the liquidus (800°–1000° C.) is similar to that of water. This high fluidity, coupled with the proximity of the glass-transition ($T_g \sim 320°$ C.) and crystallization temperatures ($T_x \sim 400°$ C.) in many HMFG compositions, translates into an oftentimes marked tendency for melts to devitrify or crystallize upon cooling. In addition, the presence of specific impurities such as hydroxyl species and trace oxides may be instrumental in the nucleation and growth of crystallites.

Standard heating and cooling or quenching practices result in undesired compositional shifting within the phase diagram due to loss of one or more volatile constituents from the melt during prolonged heating which increases the possibility of devitrification or spontaneous crystallite nucleation as the melt cools to from a glass.

These problems are often exacerbated by the melting techniques traditionally utilized to prepare glasses which involve the use of oxide starting materials converted in situ to fluorides via heating with ammonium bifluoride, $NH_4HF_2$. However, the present teaching does not preclude the use of oxides, oxyhalides, or fluorides in combination with fluorinating or reactive agents such as $NH_4HF_2$, HF, $F_2$, $NF_3$, $BF_3$, $SF_6$, $SF_4$, $CF_4$ and other fluorocarbon gases, etc., nor does it preclude the use of premelted multicomponent fluoride combinations such as cullet or devitrite.

Prior processes also use premelted cullets which required storage, transport, breakup to appropriate size for charging the melting vessel and exposure to water in the environment.

Prior methods also heated the melts for a long period to provide homogenization of the components. Besides being totally unnecessary in the case of multicomponent fluoride halide glasses, this practice results in altered composition due to escape of volatiles as well as contamination from the sublimation and reaction products of said volatiles. Extended holding of temperature above 800° C. particularly should be avoided in the case of fluorozirconate glass, for example, because the vapor pressure of the major (about 57 percent by weight) constituent, zirconium tetrafluoride, $ZrF_4$, is one atmosphere at 800° C. Its loss is readily observable as voluminous fuming and deposition of crystalline zirconium fluoride sublimate on the melt container supports, furnace components and viewports. It is, therefore, desirable to limit the hold time at 800° C. and above to a minimum consistent with effective fusion and mixing of the constituent compounds to form high optical quality glass, the composition of which is virtually identical to the composition of the starting material batch. Minimizing loss of volatiles also avoids obstructed viewing of the glass melt, debris drop-in during the hold or on cooling and solidification, and the need for extensive cleanup between glassmaking operations. While the conventional method represents a simple and straightforward approach to glass preparation, it has encountered difficulties in reproducing physical and optical properties from batch to batch. Moreover, such "conventionally" prepared samples often contain inclusions, crystallities and/or flow striae, the latter formed during casting of the melt. U.S. Pat. No. 4,666,486 is incorporated by reference.

SUMMARY OF THE INVENTION

The present invention is directed at a method of heating and cooling halide glasses to produce high optical quality glass.

One starts the glass production process with raw fluoride or fluorinated compounds in any combination of powder, granule or lump crystal forms in the batch constituent mixture. This invention obviates a need for making premelted cullets which required storage, transport, breakup to appropriate size for charging the melting vessel and exposure to water in the atmosphere.

The combined halide glass constituents are placed in a furnace being of conventional closed chamber design. In phase I, the starting materials are rapidly melted in less than one hour to a point where there is substantial fusion of these materials. After the peak temperature is reached, the melt is rapidly cooled to a semi-solid or solid condition (non-fluid). Phase II is started where the cooled melt is rapidly reheated to a temperature at which the last vestige of unmelted material disappears. At this point, the reheated melt is again rapidly cooled to a vitreous condition. The total time of most runs were 80 minutes or less and under heat ranged from 35 to 95 minutes. What is more crucial, however, is the time that the melt is held above 800° C. where extensive fuming of the melt and loss of volatiles is apt to occur. The total time at which the glassmaking melts of this invention were held at 800° or above ranged from 12 to 31 minutes and averaged 25 minutes. In Phase I, fusion, the time ranged from zero to 9 minutes and averaged 5 minutes. In Phase II, remelt, the time ranged from 12 to 24 minutes and averaged 20 minutes. Previous heating and cooling schedules although lasting only about two hours do not reheat and recool the melt. Therefore, it is one object of the present invention to provide a schedule that minimizes the loss of volatile materials in the forming of halide glasses. It is another object of the present invention to provide a method of heating and cooling that repeatedly and efficiently produces high quality optical halide glass in bulk. It is another object of the present invention to provide a process such that the glass-forming mixture is strictly confined in the unaltered, closed reaction environment throughout the entire glassmaking procedure.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 1 illustrates the multi-phase schedule of preparing halide glasses.

FIG. 2 is a partial view of the type of furnace used in the invention.

DETAILED DESCRIPTION OF THE PREFERRED EMBODIMENT

Figure 3:
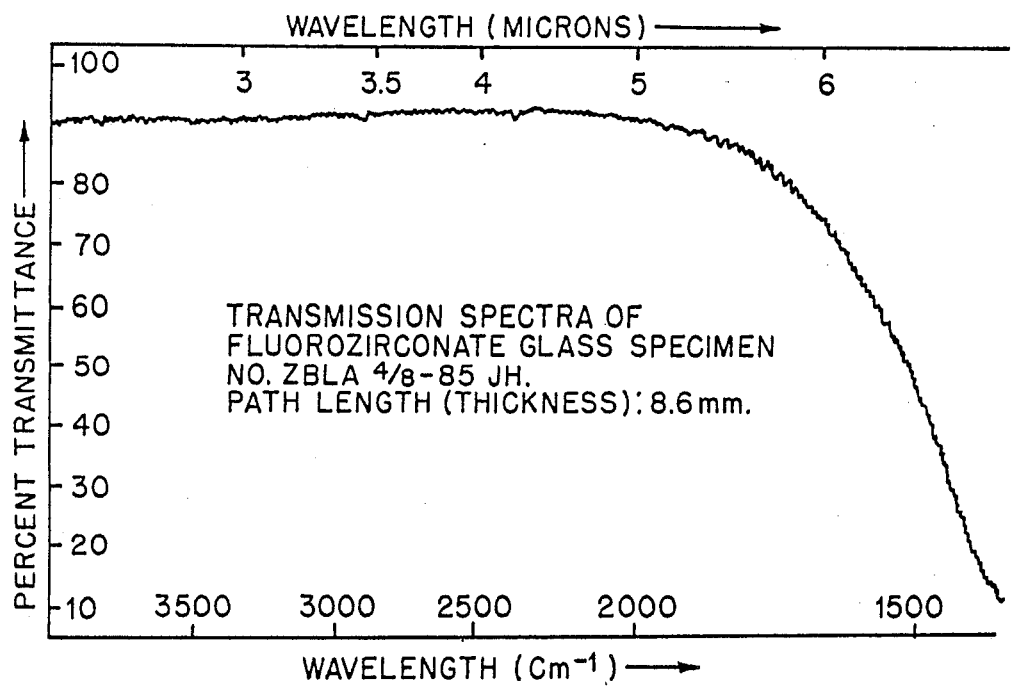
FIG. 3 is a transmission spectra of one sample produced by this invention.

Referring to FIG. 2, a crucible 10 with a charge 12 is placed in a susceptor 16 which rests upon a support 22. A protective wall 26 prevents contact with RF induction coil 24. Support 22 and wall 26 rest upon a pedestal 28 and support 32. A lower retractor shaft 30 has a thermocouple 36 therein which is in contact with crucible 10. An upper retractor hanger 18 is connected to susceptor 16 or crucible 10 so that crucible 10 can be removed from the source of heat. A steeper cooling gradient is achieved when the hanger 18 is connected to crucible 10. The substantially airtight chamber and other needed apparatus for the glass forming apparatus is not shown but is conventional. The atmosphere in the chamber is a controlled inert, reactive or slightly oxidizing atmosphere.

After the starting materials have been placed in crucible 10 and the desired atmosphere established, the fusion stage, phase I, see FIG. 1, is started. The materials are heated as rapidly as possible until substantial fusion or melting has occurred. The first melt is then cooled in-place by removing the power. The first melt is cooled until it becomes, at least, a non-fluid. It may be solid or semi-solid at that point. At or thereafter, the refusion phase, phase II, is commenced by reapplying power and raising the temperature of the melt to complete remelting and clarification of the liquid. Following a brief period, several minutes at that temperature to ensure homogenization, the power is shut off simultaneously with the separation of the crucible from the heat source. Pedestal 28 can be also lowered. See Table 1 for specific times.

In the application of the invention to producing high quality HBLA glass, the glass forming process consists of:

PHASE I

In as short a time as possible, one rapidly heats the raw halide mixture or batch to at least 650° C. but preferably to around 800° to 825° C. Heating can be at a rate as fast as the furnace system will safely permit. Rates of 80° C. per minute have been demonstrated to be effective. The purpose of this accelerated heating schedule is to make the procedure time-efficient and to conserve very expensive starting materials by shortening the time available for evaporative losses. This has the added advantage of preserving the optimum glass-forming starting composition. This is extremely important in refractive index tailoring of optical fibers. Experimentally, the temperature range 800° to 850° C. has been established as the range within which 90 to 95 percent of the starting batch has gone into solution but a residual quantity may remain incompletely fused to substantially higher temperatures. Attempts to melt-in this residue exacerbate the problems. Next, one turns off the power to the heater (or removes the source of heat) to bring about cooling of the mixture. This can be done With the crucible and support assembly left in-place.

PHASE II

After the contents of the crucible have substantially solidified the power to the heater is turned on again and the temperature rapidly increased, as before, to bring about complete fusion or melting. This point has been observed to occur at temperatures ranging from 765° ± 10° C. to 855° ± 10° C., depending upon composition of the melt and the atmosphere used. After a brief holding period (one to twenty minutes) at this temperature or at a level, for example, 0 to 50 degrees higher, the melt is rapidly cooled to the solid vitreous or glassy condition by simultaneously turning off the power to the heater and withdrawing the support pedestal or by removing the melt from the furnace and poring (casting) into a mold. An example of materials produced as glass are noted in Table 1. An example of the transmission spectrum of a fluorozirconate glass prepared by the teaching of this invention is shown in FIG. 3.

TABLE 1

| SAMPLE | TIME UNDER HEAT BY PHASE | TOTAL TIME HEATING | TIME ABOVE 800° C. BY PHASE | TOTAL TIME ABOVE 800° C. | COOLING TEMPERATURE |
| --- | --- | --- | --- | --- | --- |
| HBLA 3/29-85JH | 37 - I (869) | 79 | 7 - I | 29 | 362 |
|  | 42 - II(864) |  | 22 - II |  |  |
| HBLA 4/1-85JH | 15 - I (885) | 35 | 5 - I | 19 | 408 |
|  | 20 - II(876) |  | 14 - II |  |  |
| ZBLANI 4/2-85JH | 19 - I (781) | 56 | 0 - I | 12 | 310 |
|  | 37 - II(876) |  | 12 - II |  |  |
| ZBLA 4/8-85JH | 37 - I (866) | 79 | 8 - I | 31 | 363 |
|  | 42 - II(879) |  | 23 - II |  |  |
| ZBLA 4/10/-85JH | 38 - I (866) | 82 | 7 - I | 29 | 368 |
|  | 44 - II(877) |  | 22 - II |  |  |
| ZBLAN 4/15-85JH | 36 - I (803) | 93 | 3 - I | 25 | 496 |
|  | 57 - II(850) |  | 21 - II |  |  |
| ZBLA 4/29-85JH | 40 - I (810) | 83 | 1 - I | 20 | 122 |
|  | 43 - II(813) |  | 19 - II |  |  |
| ZBLA 5/7-85JH | 43 - I (832) | 91 | 4 - I | 20 | Room Temperature |
|  | 48 - II(816) |  | 16 - II |  |  |
| ZBLA 5/16- | 40 - I (841) | 80 | 8 - I | 25 | 183 |

TABLE 1-continued

| SAMPLE | TIME UNDER HEAT BY PHASE | TOTAL TIME HEATING | TIME ABOVE 800° C. BY PHASE | TOTAL TIME ABOVE 800° C. | COOLING TEMPERATURE |
|---|---|---|---|---|---|
| 85JH | 40 - II(816) | | 17 - II | | |
| HBLA 5/24-85JH | 40 - I (857)<br>42 - II(819) | 82 | 8.5 - I<br>20.5 - II | 29 | 315 |
| ZBLAN 5/22-85JH | 38 - I (888)<br>35 - II(804) | 73 | 9 - I<br>17 - II | 26 | 212 |
| BZnYbTh 5/23-85JH | 60 - I (815)<br>35 - II(971) | 95 | 33 - I<br>19 - II | 52 | 349 |
| ZBLA 2/4-86JH | 37 - I (842)<br>40 - II(850) | 77 | 6 - I<br>24 - II | 30 | 237 |
| HBLA 2/5-86 | 35 - I (850)<br>42 - II(856) | 77 | 3 - I<br>21 - II | 24 | 282 |

First Note:
Times in min.; Temperature in Centrigade; BZnYnTh not included in averages, etc.

Second Note:
Letters in samples are as follows: H - Hafnium, B - Barium, L - Lanthanium, A - Aluminum, N - Sodium, I - Indium, Z - Zirconium, Zn - zine, Yb - Yrium, Th - Thorium; the numbers thereafter indicate date of experimental run followed by inventor's initials.

Clearly, many modifications and variations of the present invention are possible in light of the above teachings and it is therefore understood, that within the inventive scope of the inventive concept, the invention may be practiced otherwise than specifically claimed.

What is claimed is:

1. A method of rapidly forming fluorozirconate and fluorohafnate glasses, the glasses having multiple components in a starting mixture, one or more of the components being volatile at an elevated temperature, said starting mixture being placed in a crucible, the crucible being near a source of controllable heat from a furnace, the crucible being in a sealed chamber having a controlled inert, reactive or slightly oxidizing atmosphere, the method comprising the steps of:
   a. heating the mixture to a temperature such that substantially all of the mixture melts to form a first melt, said heating occurring in about one half hour to a temperature in the range of about 750 to 890 degrees centigrade;
   b. cooling the first melt by removing the source of heat to at least the temperature where the first melt becomes a non-liquid mixture;
   c. heating said non-liquid mixture in a short period of time to a temperature where the mixture completely melts to form a second melt;
   d. allowing the homogenization of said second melt for a short period of time; and
   e. cooling the second melt by removing the source of heat therefrom.

2. A method of rapidly forming fluorozirconate and fluorohafnate glasses, the glasses having multiple components in a starting mixture, one or more of the components being volatile at an elevated temperature, said starting mixture being placed in a crucible, the crucible being near a source of controllable heat from a furnace, the crucible being in a sealed chamber having a controlled inert, reactive or slightly oxidizing atmosphere, the method comprising the steps of:
   a. heating the mixture in a short period of time to a temperature such that substantially all of the mixture melts to form a first melt, said heating occurring in about one half hour to a temperature in the range of about 750 to 890 degrees centigrade, said heating above 800° C. occurring about 5 minutes;
   b. cooling the first melt by removing the source of heat to at least the temperature where the first melt becomes a non-liquid mixture;
   c. heating said non-liquid mixture in a short period of time to a temperature where the mixture completely melts to form a second melt;
   d. allowing the homogenization of said second melt for a short period of time; and
   e. cooling the second melt by removing the source of heat therefrom.

3. A method as defined in claim 1, wherein said heating of step a is above 800° C. for a time from about 5 minutes.

4. A method as defined in claim 1 for forming fluorozirconate and fluorohafnate glasses wherein said heating of said non-liquid mixture of step c is to a range of about 780° C. to about 880° C.

5. A method as defined in claim 4 wherein the homogenization occurs for about one to twenty-five in a temperature range of about 0° to 80° C., the average homogenization time being about 20 minutes.

6. A method as defined in claim 1 wherein said glasses are heated for about one hour and half with minimal loss of volatile components.

7. A method as defined n claim 2 for forming fluorozirconate and fluorohafnate glasses wherein said heating of said non-liquid mixture of step c is to a range of about 780° C. to about 880° C.

8. A method as defined in claim 7 wherein the homogenization occurs for about one to twenty-five in a temperature range of about 0 to 80° C. above 800° C., the average homogenization time being about 20 minutes.

9. A method as defined in claim 2 wherein halide glass is heated for about one hour and half with minimal loss of volatile components.

* * * * *